(12) United States Patent
Xue (10) Patent No.: US 9,730,079 B2
(45) Date of Patent: Aug. 8, 2017

(54) JOINT POSITIONING METHOD AND DEVICE

(75) Inventor: Tao Xue, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 176 days.

(21) Appl. No.: 14/394,193

(22) PCT Filed: May 23, 2012

(86) PCT No.: PCT/CN2012/075930
§ 371 (c)(1),
(2), (4) Date: Oct. 13, 2014

(87) PCT Pub. No.: WO2013/155754
PCT Pub. Date: Oct. 24, 2013

(65) Prior Publication Data
US 2015/0131487 A1      May 14, 2015

(30) Foreign Application Priority Data

Apr. 16, 2012 (CN) .......................... 2012 1 0110925

(51) Int. Cl.
*H04L 12/28* (2006.01)
*B60R 25/10* (2013.01)
(Continued)

(52) U.S. Cl.
CPC .......... *H04W 16/18* (2013.01); *G01S 5/0268* (2013.01); *H04W 24/02* (2013.01); *H04W 64/006* (2013.01)

(58) Field of Classification Search
CPC ... H04W 12/18; H04W 24/02; H04W 64/006; G01S 5/0268
See application file for complete search history.

(56) References Cited

U.S. PATENT DOCUMENTS

| 7,925,278 B2 | 4/2011 | Bani Hani |
| 7,999,742 B2 | 8/2011 | Alizadeh-Shabdiz |

(Continued)

FOREIGN PATENT DOCUMENTS

| CN | 102036165 A | 4/2011 |
| CN | 102100058 A | 6/2011 |

(Continued)

OTHER PUBLICATIONS

International Search Report in international application No. PCT/CN2012/075930, mailed on Jan. 10, 2013.
(Continued)

*Primary Examiner* — Lonnie Sweet
(74) *Attorney, Agent, or Firm* — Oppedahl Patent Law Firm LLC (57) ABSTRACT

Disclosed are a joint positioning method and device, and the method includes: a positioning module is enabled after a terminal receives a positioning request; the positioning module determines a primary positioning submodule implementing a primary positioning mode and an auxiliary positioning submodule implementing an auxiliary positioning mode according to a communication scenario or a predetermined setting; implementing respectively positioning by the primary positioning submodule and by the auxiliary positioning submodule, and outputting respective positioning results to a comparison module of the terminal; the comparison module compares the positioning results, selects an optimal positioning result and sends the optimal positioning result and/or positioning results other than the optimal positioning result to the primary positioning submodule; and the primary positioning submodule reports the optimal positioning result and/or positioning results other than the optimal positioning result to a server or the terminal through an interaction module of the terminal. The present disclosure (Continued)

can solve a problem that existing positioning applications have limited methods and poor accuracy can be better solved.

18 Claims, 5 Drawing Sheets

(51) Int. Cl.
  *G08B 1/08*  (2006.01)
  *H04W 16/18*  (2009.01)
  *G01S 5/02*  (2010.01)
  *H04W 24/02*  (2009.01)
  *H04W 64/00*  (2009.01)

(56) References Cited

U.S. PATENT DOCUMENTS

| | | | |
|---|---|---|---|
| 8,022,877 B2* | 9/2011 | Alizadeh-Shabdiz | G01S 5/0226 342/458 |
| 8,054,219 B2 | 11/2011 | Alizadeh-Shabdiz | |
| 8,089,398 B2 | 1/2012 | Alizadeh-Shabdiz | |
| 8,089,399 B2 | 1/2012 | Alizadeh-Shabdiz | |
| 8,130,148 B2 | 3/2012 | Alizadeh-Shabdiz | |
| 2007/0298761 A1 | 12/2007 | Bani Hani | |
| 2008/0129590 A1 | 6/2008 | Ikeda | |
| 2009/0270110 A1* | 10/2009 | Ardalan | H04B 1/3805 455/456.1 |
| 2009/0303112 A1 | 12/2009 | Alizadeh-Shabdiz | |
| 2009/0303113 A1 | 12/2009 | Alizadeh-Shabdiz | |
| 2009/0303114 A1 | 12/2009 | Alizadeh-Shabdiz | |
| 2009/0303115 A1 | 12/2009 | Alizadeh-Shabdiz | |
| 2009/0303119 A1 | 12/2009 | Alizadeh-Shabdiz | |
| 2009/0303120 A1 | 12/2009 | Alizadeh-Shabdiz | |
| 2009/0303121 A1 | 12/2009 | Alizadeh-Shabdiz | |
| 2010/0052983 A1 | 3/2010 | Alizadeh-Shabdiz | |
| 2011/0281380 A1 | 11/2011 | Narizuka | |
| 2011/0298659 A1 | 12/2011 | Alizadeh-Shabdiz | |
| 2012/0246074 A1* | 9/2012 | Annamalai | G01S 1/68 705/44 |

FOREIGN PATENT DOCUMENTS

| | | |
|---|---|---|
| CN | 202057801 U | 11/2011 |
| JP | 11281380 A | 10/1999 |
| JP | 2004502942 A | 1/2004 |
| JP | 2006109355 A | 4/2006 |
| JP | 2006528469 A | 12/2006 |
| JP | 2009139128 A | 6/2009 |
| JP | 2011523062 A | 8/2011 |
| JP | 2011220852 A | 11/2011 |
| JP | 2011247679 A | 12/2011 |
| JP | 2011254367 A | 12/2011 |
| JP | 201273072 A | 4/2012 |

OTHER PUBLICATIONS

English Translation of the Written Opinion of the International Search Authority in international application No. PCT/CN2012/075930, mailed on Jan. 10, 2013.

* cited by examiner

JOINT POSITIONING METHOD AND DEVICE

TECHNICAL FIELD

The present disclosure relates to the field of wireless communications, and in particular to a joint positioning method and device.

BACKGROUND

In the prior art, a method for positioning a mobile station mainly includes the following three types: Assisted Global Positioning System (AGPS) positioning, base station positioning and Wireless Fidelity (Wi-Fi) positioning. The above three positioning techniques have respective advantages and disadvantages, and also have different application scenarios.

AGPS technique is a technique for positioning a mobile station, which combines network information of a station and Global Positioning System (GPS) information, and it can be used in networks such as a Global System For Mobile Communications (GSM)/General Packet Radio Service (GPRS) network, a Wideband Code Division Multiple Access (WCDMA) network and a Code Division Multiple Access (CDMA) 2000 network.

Advantages of the AGPS solution mainly lie in its positioning accuracy, which is up to about 10 meters in a normal GPS operation environment in open areas such as outdoors, thus it is currently regarded as a positioning technique with the highest positioning accuracy. Another advantage of the technique is that a first capture time for a GPS signal is generally only several seconds, while the first capture time of GPS technique may be 2 to 3 minutes.

Though AGPS technique has a high positioning accuracy and a short first capture time for a GPS signal, it also has some disadvantages. Firstly, a problem regarding indoor positioning is still not well solved; secondly, the implementation of AGPS positioning needs multiple network transmissions, up to six unidirectional transmissions at most, thus occupying a large amount of on-the-air resources; in addition, AGPS technique requires an GPS receiver module to be added into a mobile terminal and an antenna of the mobile to be restructured, and devices such as a position server and a differential GPS reference station needs to be built on a mobile network. Since AGPS technique requires an GPS receiver module to be added into a mobile terminal, if a user wants to use an AGPS mobile positioning service, he/she has to replace his/her current mobile terminal with one having an GPS receiver module added therein.

A base station is a signal reception/transmission station for a mobile phone. Since a base station is built by an operator, the operator can acquire identification information of the base station, i.e., Location Area Code (LAC) and Cell Identifier (CID). When a mobile terminal is positioned, an LAC and a CID are transmitted to a remote server, which through triangulation calculation can perform positioning on the mobile terminal. The base station positioning is typically applied to a positioning service for 110 alarm, and can perform indoor positioning but with common accuracy, furthermore, the premises of positioning are that there must be mobile phone services.

Wi-Fi is a technique which can interconnect wirelessly a personal computer, a hand-held device and the like. Wireless routers are currently set in companies, shopping malls and homes, and they are Wi-Fi wireless hotspot devices. Similarly to the base station positioning, when positioning is performed through Wi-Fi, after finding globally unique identifiers of these Wi-Fi devices, i.e., Medium/Media Access Control (MAC) codes, a mobile terminal sends them to a remote server so as to perform positioning. The Wi-Fi positioning has common accuracy, and it can perform indoor positioning with premises that there must be Wi-Fi services.

In a positioning application for a mobile terminal, following three ways are used: 1. the above three positioning methods are performed simultaneously and a positioning result of each of the positioning methods is fed successively back to user so as to be processed accordingly; 2. only one of the three positioning methods is used to perform positioning; 3. after AGPS positioning fails, a positioning result from the base station positioning is used as a final positioning result.

For a user, each of the three ways has certain disadvantages: way 1 has poor user experiences, the user is only desirable to acquire an accurate positioning result instead of caring about positioning results made by respective methods; due to the use of only one positioning method, way 2 is only applied to some positioning scenarios, and in certain scenarios the use of only one positioning method may result in an inaccurate positioning result; compared with way 2, way 3 combines two types of positioning results, but since a result for an indoor positioning made by the base station positioning usually has great errors and in case of a non-indoor positioning the result usually depends on where a base station is located, such positioning results also have great errors.

SUMMARY

The present disclosure is intended to provide a joint positioning method and device so that a problem that existing positioning applications have limited methods and poor accuracy can be better solved.

According to an aspect of the present disclosure, provided is a joint positioning method including:

a positioning module is enabled after a terminal receives a positioning request;

the positioning module determines a primary positioning submodule implementing a primary positioning mode and an auxiliary positioning submodule implementing an auxiliary positioning mode according to a communication scenario or a predetermined setting; wherein the positioning module includes the primary positioning submodule and the auxiliary positioning submodule;

The primary positioning submodule and the auxiliary positioning submodule respectively performs positioning, and respective positioning results are outputted to a comparison module of the terminal;

the comparison module compares the positioning results, selects an optimal positioning result and sends the optimal positioning result and/or positioning results other than the optimal positioning result to the primary positioning submodule; and the primary positioning submodule reports the optimal positioning result and/or positioning results other than the optimal positioning result to a server or the terminal through an interaction module of the terminal.

In an embodiment, the step of determining by the positioning module a primary positioning submodule implementing a primary positioning mode and an auxiliary positioning submodule implementing an auxiliary positioning mode according to the communication scenario or a predetermined setting includes:

the positioning module determines the primary positioning mode according to a communication scenario or the predetermined setting;

the positioning module selects from its multiple positioning submodules a positioning submodule implementing the primary positioning mode as the primary positioning submodule and selects positioning submodules implementing positioning modes other than the primary positioning mode as the auxiliary positioning submodule.

In an embodiment, the positioning submodules include a Wi-Fi positioning submodule, a base station positioning submodule and an AGPS positioning submodule.

In an embodiment, the step of determining by the positioning module the primary positioning mode according to a communication scenario or the predetermined setting includes:

the positioning module selects according to a communication scenario a positioning mode having a longest positioning time as the primary positioning mode; or the positioning module determines the primary positioning mode according to a predetermined setting or a default setting of the terminal.

In an embodiment, after the step of sending the optimal positioning result and/or other positioning results to the primary positioning submodule, the method further includes:

the primary positioning submodule processes the optimal positioning result and/or other positioning results according to upload requirements of the primary positioning submodule.

In an embodiment, a monitoring module of the terminal sets different timers to control positioning periods of respective positioning submodules;

when a timer reaches a preset maximum positioning period and a corresponding positioning submodule doesn't output a positioning result, it is determined that the corresponding positioning submodule fails in positioning.

According to another aspect of the present disclosure, provided is a joint positioning device including:

a positioning module configured to, after a terminal receives a positioning request, determine a primary positioning submodule implementing a primary positioning mode and an auxiliary positioning submodule implementing an auxiliary positioning mode according to a communication scenario or a predetermined setting; wherein the positioning module comprises the primary positioning submodule and the auxiliary positioning submodule; and the primary positioning submodule and the auxiliary positioning submodule are configured to implement respectively a positioning operation and output respective positioning results to a comparison module;

the comparison module configured to compare the positioning results, select an optimal positioning result and send the optimal positioning result and/or other positioning results to the primary positioning submodule in the positioning module; and an interaction module configured to report the optimal positioning result and/or other positioning results received by the primary positioning submodule to a server or the terminal.

In an embodiment, the positioning module is further configured to determine the primary positioning mode according to the communication scenario or the predetermined setting;

select from its multiple positioning submodules a positioning submodule implementing the primary positioning mode as the primary positioning submodule and select positioning submodules implementing positioning modes other than the primary positioning mode as the auxiliary positioning submodule.

In an embodiment, the positioning submodules include a Wi-Fi positioning submodule, a base station positioning submodule and an AGPS positioning submodule.

In an embodiment, the device further includes:

a monitoring module configured to set different timers to control positioning periods of respective positioning submodules, wherein when a timer reaches a preset maximum positioning period and a corresponding positioning submodule doesn't output a positioning result, it is determined that the corresponding positioning submodule fails in positioning.

Compared to the prior art, beneficial effects of the present disclosure lie in: a user need not care about which positioning mode is used, a positioning application will take various positioning results into consideration, compare them, choose a result with the highest accuracy and feed it back to the user, thus improving greatly user experiences on the terminal; in addition, the application of the joint positioning to a terminal having a touch screen helps a lot in improving greatly the usability of a 3G mobile terminal and the reputation regarding user experiences.

DETAILED DESCRIPTION

Preferred embodiments of the present disclosure will be elaborated below with reference to accompanying drawings, and it should be appreciated that preferred embodiments described below are only used to describe and explain the present disclosure instead of limiting it.

Figure 1:
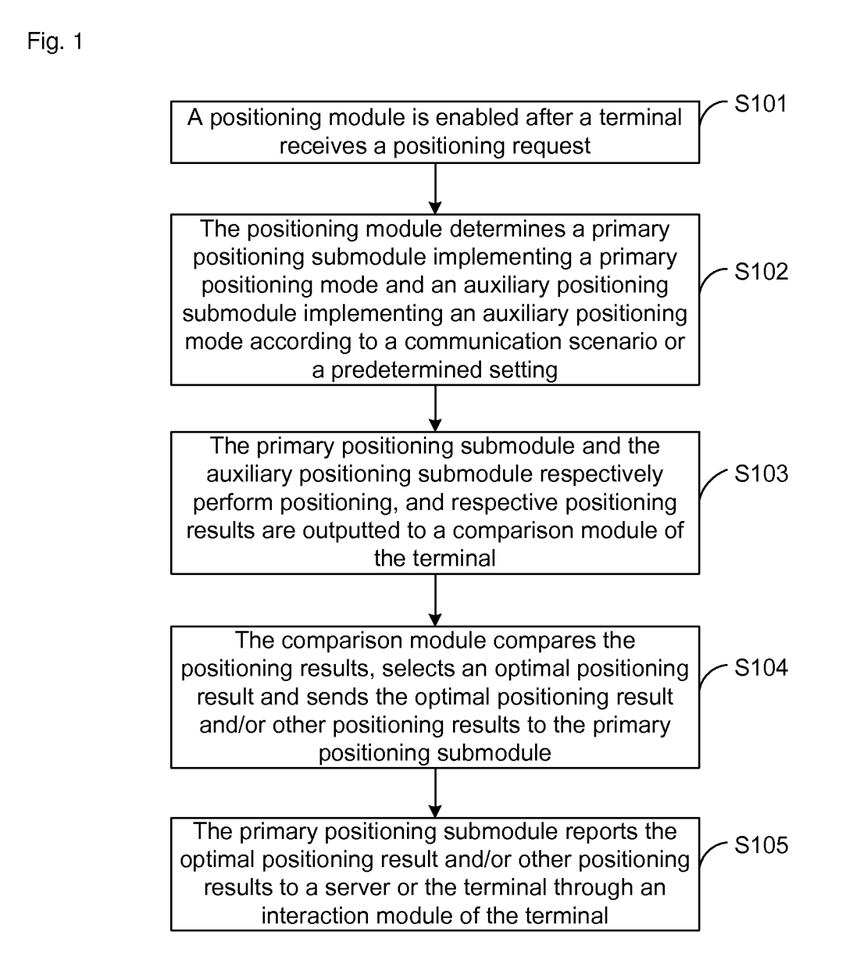
FIG. 1 is a flow chart of a joint positioning method provided by a first embodiment of the present disclosure.

FIG. 1 is a flow chart of a joint positioning method provided by a first embodiment of the present disclosure, as shown in FIG. 1, the method includes the following steps:

step S101, a positioning module is enabled after a terminal receives a positioning request.

The terminal includes a positioning module, a comparison module, a monitoring module and an interaction module. Wherein the positioning module includes multiple positioning submodules, and the multiple positioning submodules specifically include a Wi-Fi positioning submodule, a base station positioning submodule and an AGPS positioning submodule. After the terminal receives a positioning request from a network server side or after the terminal itself initiates a positioning request, the positioning module is enabled.

Step S102, the positioning module determines a primary positioning submodule implementing a primary positioning mode and an auxiliary positioning submodule implementing an auxiliary positioning mode according to a communication scenario or a predetermined setting.

After the positioning module is enabled, the primary positioning mode is firstly determined according to a communication scenario or the predetermined setting. Wherein the determination of the primary positioning mode may include: a positioning mode having a longest positioning time is selected as the primary positioning mode according to a communication scenario; or the primary positioning mode is determined according to a predetermined setting or a default setting of the terminal. After determining the primary positioning mode, the positioning module selects from its multiple positioning submodules a positioning submodule implementing the primary positioning mode as the primary positioning submodule and selects positioning submodules implementing other positioning modes as the auxiliary positioning submodule. For example, if the primary positioning mode determined by the positioning module is a Wi-Fi positioning, a Wi-Fi positioning submodule is selected as the primary positioning submodule, and others such as a AGPS positioning submodule and a base station positioning submodule are selected as the auxiliary positioning submodule.

Step S103, the primary positioning submodule and the auxiliary positioning submodule respectively performs positioning, and respective positioning results are outputted to a comparison module of the terminal.

After the positioning module determines the primary positioning submodule and the auxiliary positioning submodule, the primary positioning submodule and the auxiliary positioning submodule are enabled simultaneously or in certain sequence so as to perform joint positioning, and the primary positioning submodule and the auxiliary positioning submodule output their respective positioning results. Wherein, the positioning result outputted by the auxiliary positioning submodule is sent to the primary positioning submodule, and the primary positioning submodule sends a received positioning result and its own positioning result to the comparison module. In addition, the monitoring module sets different timers to control positioning periods of respective positioning submodules, wherein when a timer reaches a preset maximum positioning period and a corresponding positioning submodule doesn't output a positioning result, it is determined that the corresponding positioning submodule fails in positioning and then the primary positioning submodule is notified of the failure.

Step S104, the comparison module compares the positioning results, selects an optimal positioning result and sends the optimal positioning result and/or positioning results other than the optimal positioning result to the primary positioning submodule.

The comparison module may perform a comparison according to accuracy information of different positioning modes, select an optimal positioning result having a highest positioning accuracy and send the optimal positioning result and/or other positioning results to the primary positioning submodule.

Step S105, the primary positioning submodule reports the optimal positioning result and/or positioning results other than the optimal positioning result to a server or the terminal through an interaction module of the terminal.

After receiving the optimal positioning result and/or other positioning results, the primary positioning submodule performs data processing on received positioning results and converts their data format to a data format compliant with upload requirements of the primary positioning submodule. The primary positioning submodule sends a processed optimal positioning result and/or other positioning results to a network server side or a terminal side via the interaction module.

Figure 2:
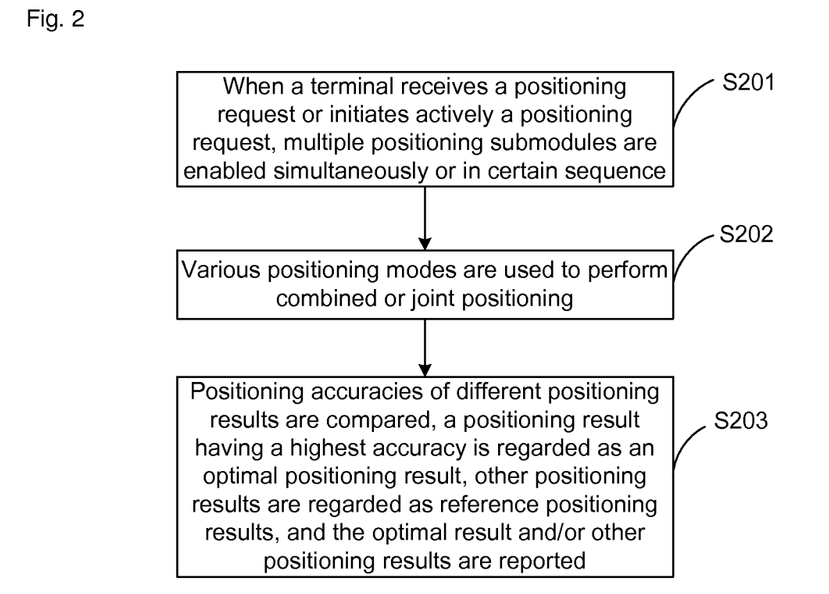
FIG. 2 is a flow chart of a joint positioning method provided by a second embodiment of the present disclosure.

FIG. 2 is a flow chart of a joint positioning method provided by a second embodiment of the present disclosure, as shown in FIG. 2, the method includes the following steps:

Step S201, after a terminal receives a positioning request or initiates actively a positioning request, multiple positioning submodules are enabled simultaneously or in certain sequence.

When the terminal receives a positioning request sent by a server in the network side or the terminal actively initiates a positioning request, a primary positioning mode and an auxiliary positioning mode are determined according to a communication scenario, and a primary positioning submodule implementing the primary positioning mode and an auxiliary positioning submodule implementing the auxiliary positioning mode are enabled simultaneously or in certain sequence.

Specifically, if the communication scenario is in an open air, the positioning period of the AGPS positioning is short, the positioning period of the Wi-Fi positioning is long, and the positioning period of the base station positioning is between the former two; if the communication scenario is in an urban area, the positioning period of the Wi-Fi positioning is short, the positioning period of the AGPS positioning is long, and the positioning period of the base station positioning is between the former two; if the communication scenario is in an indoor area, the positioning period of the base station positioning is short, the positioning period of the AGPS positioning is long, and the positioning period of the Wi-Fi positioning is between the former two. In different scenarios, the terminal user can set a positioning mode having a longest positioning period as the primary positioning mode, and it can also set a default primary positioning mode of the terminal as the primary positioning mode.

The simultaneous enabling the primary positioning submodule and the auxiliary positioning submodule by the terminal does not mean that respective positioning submodules perform independently positioning, instead, the positioning process should be carried out in a mixed way, i.e., the primary positioning submodule implements the primary positioning mode, the auxiliary positioning mode implemented by the auxiliary positioning submodule is carried out as interludes in the primary positioning mode, and positioning results of all positioning submodules and an optimal positioning result finally selected are reported through a processing process of the primary positioning submodule to a network server side or a user terminal side.

Wherein though multiple positioning submodules simultaneously perform positioning, the positioning process is combinative, not only positioning original data are desired to be interacted, but also positioning results of different positioning submodules are also desired to be selected, deleted and compared under the control of a specified primary positioning submodule; the so-called performing simultaneously positioning only means that an initial time at which respective positioning submodules are enabled is the same, and during positioning, different positioning modes have different positioning periods, in order to ensure smooth proceeding of each positioning mode, the primary positioning mode can be selected as a positioning mode having a longest positioning period, and positioning results of different positioning submodules during positioning are also desired to be sent to the primary positioning submodule for data arrangement.

The enabling multiple positioning submodules by the terminal in certain sequence does not mean that various positioning submodules are only desired to be enabled in sequence, similarly, positioning processes of these different positioning submodules are also carried out in a mixed way, i.e., there is a primary positioning submodule which implements the primary positioning mode, other positioning submodules can perform positioning in sequence during the positioning process of the primary positioning submodule, and positioning results of all positioning submodules and an optimal positioning result finally selected are reported through a related processing process of the primary positioning submodule to a network server side or a user terminal side.

Step S202, Various positioning modes are used to perform combined or joint positioning.

The combination of various positioning modes needs reordering the sequence of various positioning modes during the positioning, those having a relatively slow positioning process can be regarded as a primary positioning mode, those having a relatively fast positioning process are added into the primary positioning mode, and different timers are used to control respective positioning processes so as to avoid a case in which a timeout positioning failure can be processed. Positioning results of different positioning modes are also different.

Step S203, positioning accuracies of different positioning results are compared, a positioning result having a highest accuracy is regarded as an optimal positioning result, other positioning results are regarded as reference positioning results, and the optimal result and/or other positioning results are reported.

Positioning results outputted by respective positioning modes are compared, a positioning result having a highest positioning accuracy is selected as the optimal positioning result. The primary positioning submodule converts data formats of the optimal positioning result and other positioning results to a data format compliant with upload requirements of the primary positioning submodule, and reports converted optimal positioning result and/or other positioning results to a network side server or a terminal user side through a reporting process of the primary positioning submodule.

Figure 3:
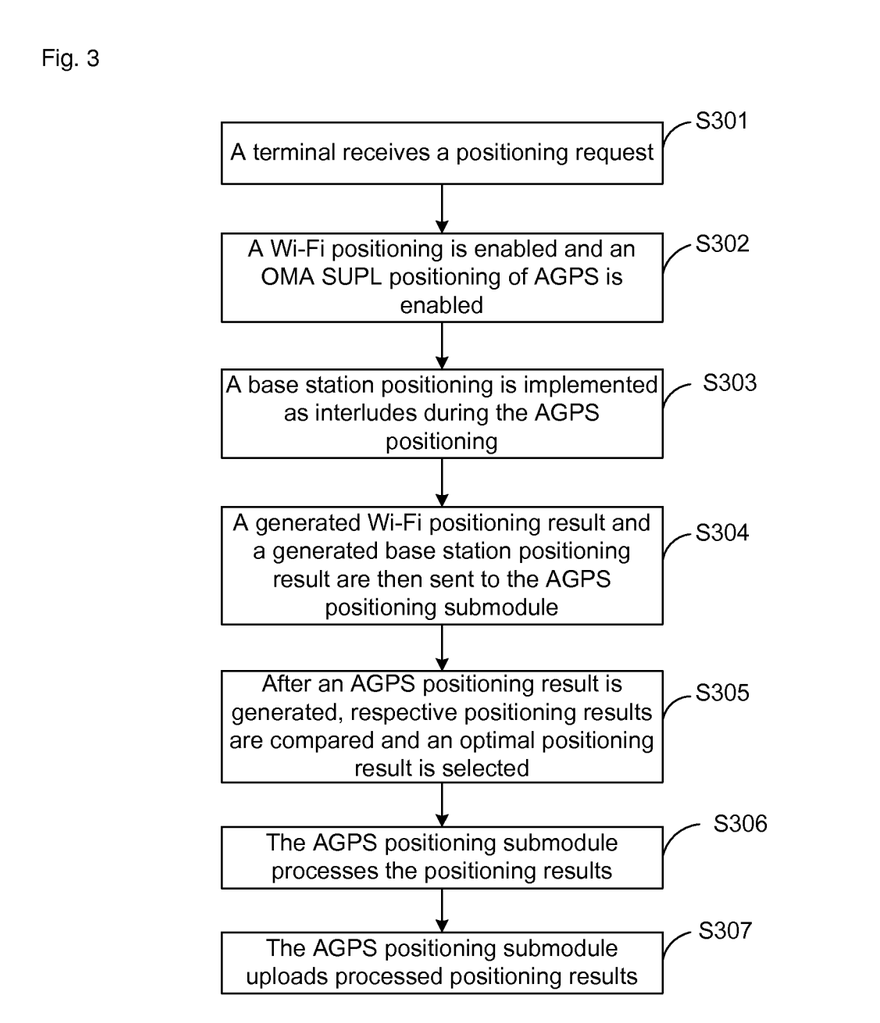
FIG. 3 is a flow chart of a joint positioning method provided by a third embodiment of the present disclosure.

FIG. 3 is a flow chart of a joint positioning method provided by a third embodiment of the present disclosure, in this embodiment, the AGPS positioning is regarded as a primary positioning mode, and an auxiliary positioning mode includes the base station positioning and the Wi-Fi positioning. As shown in FIG. 3, the method includes the following steps:

Step S301, a terminal receives a positioning request.

When the terminal receives a positioning request initiated by a network server side or the terminal actively initiates a positioning request, the AGPS positioning is regarded as a primary positioning mode according to a predetermined setting of the user or a default setting of the terminal, thereby an AGPS positioning submodule is selected as a primary positioning submodule, and a Wi-Fi positioning submodule and a base station positioning submodule are regarded as an auxiliary positioning submodule.

Step S302, a Wi-Fi positioning is enabled and an OMA SUPL positioning of AGPS is enabled.

After the terminal determines the primary positioning submodule and the auxiliary positioning submodule, the positioning module enables the primary positioning submodule, i.e., the AGPS positioning submodule, and enables the auxiliary positioning submodule, i.e., the Wi-Fi positioning submodule. The AGPS submodule implements an Open Mobile Architecture Secure user Plane Location (OMA SUPL) process of AGPS. A monitoring module of the terminal set respectively maximum positioning periods for the Wi-Fi positioning submodule and the AGPS positioning submodule, when a positioning period of the Wi-Fi positioning submodule exceeds a corresponding maximum positioning period and no Wi-Fi positioning results are outputted, the monitoring module determines that the Wi-Fi positioning fails. Similarly, if the AGPS positioning times out, it is determined that the AGPS positioning fails. The Wi-Fi positioning and the AGPS positioning are existing techniques, the detailed description thereof will be omitted.

Step S303, a base station positioning is implemented as interludes during the AGPS positioning.

During OMA SUPL positioning of the AGPS, the base station positioning submodule is enabled. The base station positioning submodule initiates an enhanced cell ID positioning process. The monitoring module sets a maximum positioning period for the base station positioning, when a positioning period of the enhanced cell ID positioning exceeds a corresponding maximum positioning period and no base station positioning results are outputted, the monitoring module determines that the base station positioning fails. The enhanced cell ID positioning is an existing technique, and the detailed description thereof will be omitted.

Wherein during the OMA SUPL positioning, a description of base station positioning results are added into a field of an assistance data message of the Radio Resource Location services (LCS) Protocol (RRLP).

Step S304, a generated Wi-Fi positioning result and a generated base station positioning result are then sent to the AGPS positioning submodule.

After generating a positioning result, the Wi-Fi positioning submodule sends the Wi-Fi positioning result to the primary positioning submodule, i.e., the AGPS positioning submodule, the AGPS positioning submodule records the Wi-Fi positioning result and waits for an AGPS positioning result, then the Wi-Fi positioning process ends. Similarly, after the base station positioning submodule generates a positioning results, the base station positioning process ends, and the base station positioning result is sent to the primary positioning submodule.

Step S305, after an AGPS positioning result is generated, respective positioning results are compared and an optimal positioning result is selected.

After the AGPS positioning result is generated, the AGPS positioning submodule calls a comparison module, and the comparison module compares the three positioning results, selects a result having a highest accuracy as an optimal positioning result, and selects the other two positioning results as reference positioning results. The comparison module returns the optimal positioning result and/or other positioning results to the AGPS positioning submodule.

Step S306, the AGPS positioning submodule processes the positioning results.

The AGPS positioning submodule converts the format of the three positioning results so that the format of the positioning results meets upload requirements of the OMA SUPL positioning results.

Step S307, the AGPS positioning submodule uploads processed positioning results.

The AGPS positioning submodule uploads to an AGPS positioning server or a user terminal side an optimal positioning result compliant with upload requirements of the OMA SUPL positioning results and/or other positioning results.

If the Wi-Fi positioning mode is regarded as the primary positioning result during the above process, the Wi-Fi positioning process does not end in step S304; in step S305, after an AGPS positioning result is generated, it is directly uploaded to an AGPS positioning server, then the AGPS positioning process ends; in step S306, when the data format of the three positioning results are converted, the conversion should be performed according to an upload format required by a Wi-Fi positioning server or the Wi-Fi positioning submodule, and the optimal positioning result and/or other positioning results are uploaded to the Wi-Fi positioning submodule or the Wi-Fi positioning server, finally the Wi-Fi positioning process ends.

In other words, the positioning process of the primary positioning submodule ends lastly, and the operation of the auxiliary positioning submodule ends right after its positioning completes, then the positioning result of the auxiliary positioning submodule and the positioning result of the primary positioning submodule are compared, a positioning result having a highest positioning accuracy is selected as an optimal positioning result, data formats of all positioning results are converted according to requirements on the upload format of the primary positioning submodule or a primary positioning server, and converted positioning results are uploaded to the primary positioning submodule or the primary positioning server for subsequent service processing.

In general, a positioning period of a primary positioning application is relatively long, therefore the comparison and format conversion are implemented after results of other positioning applications are available.

Figure 4:
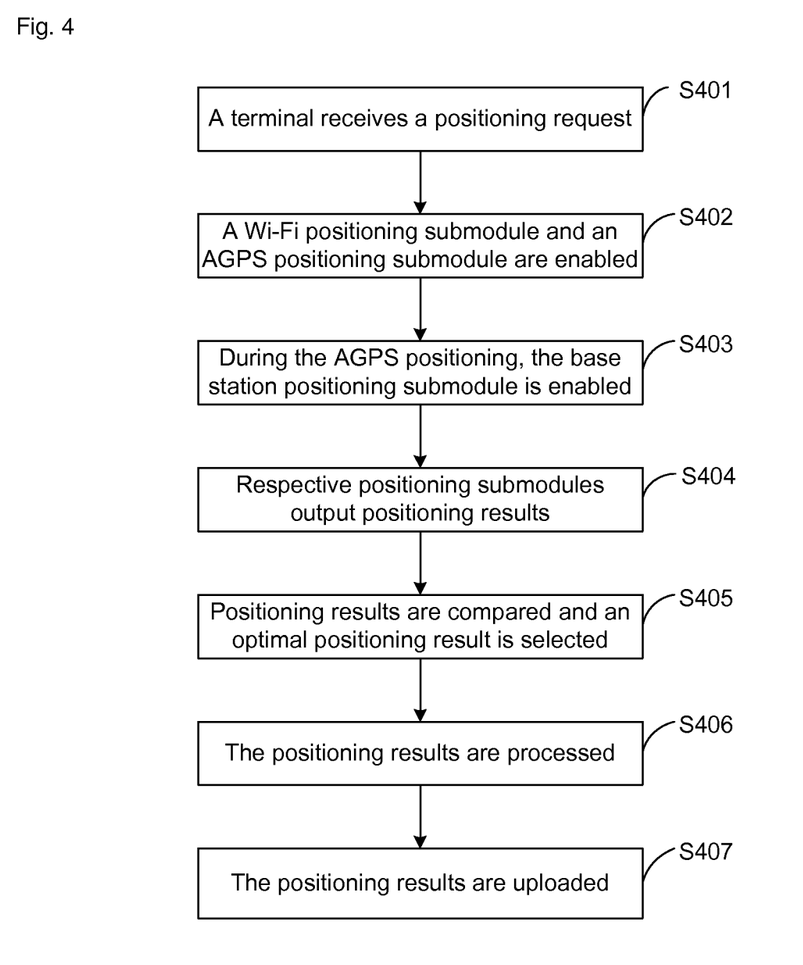
FIG. 4 is a flow chart for a case in which some of positioning modes fail according to a fourth embodiment of the present disclosure.

FIG. 4 is a flow chart for a case in which some of positioning modes fail according to a fourth embodiment of the present disclosure. The embodiment are described by taking the AGPS positioning as the primary positioning mode, other positioning modes supported include the enhanced ID positioning and the Wi-Fi positioning. As shown in FIG. 4, the method includes the following steps:

Step S401, a terminal receives a positioning request.

Step S402, a Wi-Fi positioning submodule and an AGPS positioning submodule are enabled.

After the terminal receives a positioning request, the Wi-Fi positioning submodule and the AGPS positioning submodule are enabled. The Wi-Fi positioning submodule performs Wi-Fi positioning, and the AGPS positioning submodule performs OMA SUPL positioning of AGPS. The Wi-Fi positioning and the AGPS positioning are existing techniques, the detailed description thereof will be omitted.

Step S403, during the AGPS positioning, the base station positioning submodule is enabled.

During the AGPS positioning, the base station positioning submodule is enabled. The base station positioning submodule performs enhance cell ID positioning.

Step S404, respective positioning submodules output positioning results.

The AGPS positioning submodule, the base station positioning submodule and the Wi-Fi positioning submodule output their respective positioning results, wherein the positioning results of the base station positioning submodule and the Wi-Fi positioning submodule are sent to the primary positioning submodule, i.e., the AGPS positioning submodule.

A monitoring module of the terminal set respectively a timer for the Wi-Fi positioning, the AGPS positioning and the base station positioning. When a positioning period of the Wi-Fi positioning exceeds a maximum positioning period of a corresponding timer, it is determined that the Wi-Fi positioning fails. Similarly, when a positioning period of the AGPS positioning exceeds a maximum positioning period of a corresponding timer, it is determined that the AGPS positioning fails, and when a positioning period of the base station positioning exceeds a maximum positioning period of a corresponding timer, it is determined that the base station positioning fails. After it is determined that a positioning fails, the monitoring module sends a positioning failure notice to the primary positioning submodule.

Step S405, positioning results are compared and an optimal positioning result is selected.

After the primary positioning submodule receives positioning results and/or the failure notice, a comparison module is called, and the comparison module compares the positioning results, selects a result having a highest accuracy as an optimal positioning result, and selects the other positioning results as reference positioning results.

Step S406, the positioning results are processed.

after selecting the optimal positioning result, the comparison module returns the optimal positioning result and other positioning results to the primary positioning submodule, and the primary positioning submodule performs a format conversion on received positioning results so that converted positioning results meet upload requirements of an OMA SUPL positioning result.

Step S407, the positioning results are uploaded.

The primary positioning submodule i.e., the AGPS positioning submodule uploads processed positioning results to an AGPS positioning server, then the AGPS positioning process ends.

If in the above process the WI-Fi positioning is the primary positioning mode, the format of positioning results after the positioning succeeds is converted according to a format required by a Wi-Fi positioning server or the Wi-Fi positioning submodule, and the positioning results are uploaded to the Wi-Fi positioning submodule or the Wi-Fi positioning server, and finally the Wi-Fi positioning process ends.

In other words, after the positioning of any positioning submodule fails during a positioning process, it is only desired to compare successful positioning results, select a positioning result having a highest positioning accuracy as a final positioning result, convert the format of all successful positioning results according to a format requirement of the primary positioning submodule, and upload converted positioning results to the primary positioning submodule or the primary positioning server for subsequent service processing.

Figure 5:
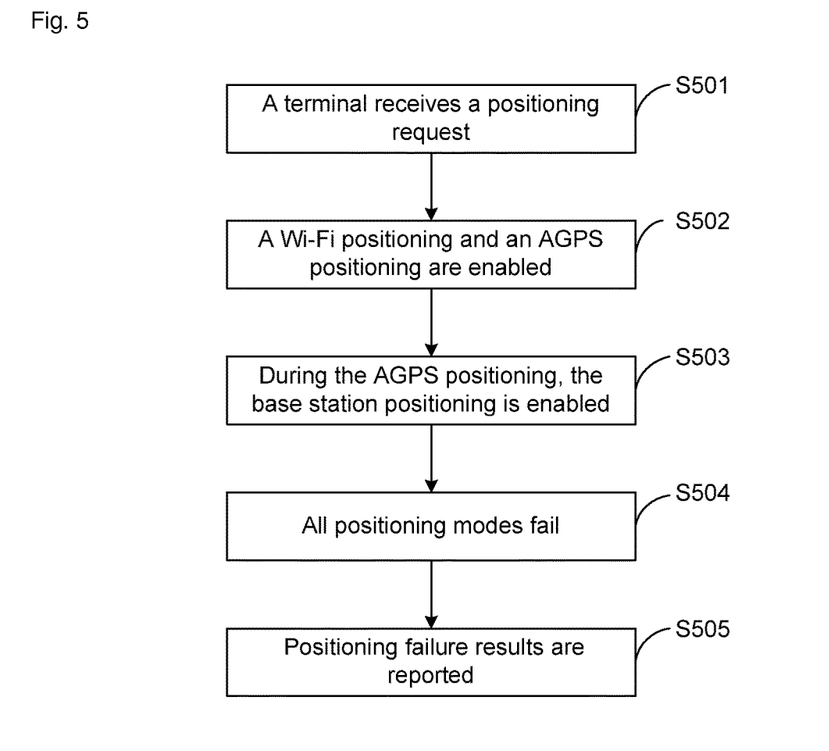
FIG. 5 is a flow chart for a case in which all positioning modes fail according to a fifth embodiment of the present disclosure.

FIG. 5 is a flow chart for a case in which all positioning modes fail according to a fifth embodiment of the present disclosure. The embodiment are described by taking the AGPS positioning as the primary positioning mode, auxiliary positioning modes supported include the enhanced ID positioning and the Wi-Fi positioning. As shown in FIG. 5, the method includes the following steps:

Step S501, a terminal receives a positioning request.

The terminal receives a positioning request initiated by the network side or the terminal actively initiates a positioning request.

Step S502, a Wi-Fi positioning and an AGPS positioning are enabled.

The terminal enables the Wi-Fi positioning submodule and the AGPS positioning submodule, the Wi-Fi positioning submodule performs Wi-Fi positioning and the AGPS positioning submodule performs OMA SUPL positioning of AGPS.

Step S503, during the AGPS positioning, the base station positioning is enabled.

Step S504, all positioning modes fail.

A monitoring module sets respectively a corresponding timer for the Wi-Fi positioning, the AGPS positioning and the base station positioning, and sets corresponding maximum mouse hover periods. When a positioning period of the Wi-Fi positioning exceeds its corresponding maximum mouse hover period, it is determined that the Wi-Fi positioning fails; When a positioning period of the AGPS positioning exceeds its corresponding maximum mouse hover period, it is determined that the AGPS positioning fails; and When a positioning period of the base station positioning exceeds its corresponding maximum mouse hover period, it is determined that the base station positioning fails. The monitoring module sends positioning failure notices of respective positioning submodules to the primary positioning submodule of the positioning module.

Step S505, positioning failure results are reported.

If positioning of all positioning submodules fails, the primary positioning submodule reports the positioning failure results in a report format of the primary positioning submodule to the primary positioning submodule or a primary positioning server.

Figure 6:
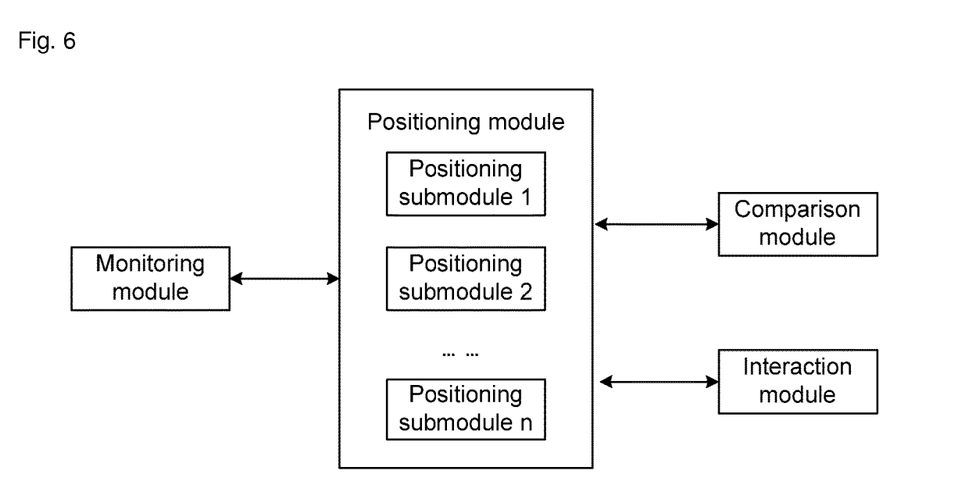
FIG. 6 is a schematic diagram illustrating the structure of a joint positioning device provided by a sixth embodiment of the present disclosure.

FIG. 6 is a schematic diagram illustrating the structure of a joint positioning device provided by a sixth embodiment of the present disclosure, as shown in FIG. 6, the device includes a comparison module, a monitoring module, a positioning module and an interaction module. Wherein the positioning module includes 1 to n positioning submodules, and the n positioning submodules can specifically be a Wi-Fi positioning submodule, a base station positioning submodule and an AGPS positioning submodule.

The positioning module is configured to determine a primary positioning submodule implementing a primary positioning mode and an auxiliary positioning submodule implementing an auxiliary positioning mode according to a communication scenario or a predetermined setting after a positioning request is received.

Wherein one out of n positioning submodules is selected as the primary positioning submodule, and others are regarded as the auxiliary positioning submodule; the primary positioning submodule and the auxiliary positioning submodule perform respectively positioning, and output their respective positioning results to the comparison module.

Wherein the positioning module includes multiple positioning submodules, and the multiple positioning submodules specifically include a Wi-Fi positioning submodule, a base station positioning submodule and an AGPS positioning submodule.

The positioning module is further configured to determine the primary positioning mode according to a communication scenario or the predetermined setting, select from its multiple positioning submodules a positioning submodule implementing the primary positioning mode as the primary positioning submodule and select other positioning submodules as the auxiliary positioning submodule.

The comparison module is configured to compare the positioning results, select an optimal positioning result and send the optimal positioning result and/or other positioning results to the primary positioning submodule in the positioning module.

The interaction module is configured to report to a server or the device the optimal positioning result and/or other positioning results received by the primary positioning submodule. After receiving the optimal positioning result and/or other positioning results, the primary positioning submodule performs a format conversion on them according to upload requirements of the primary positioning submodule, and then calls the interaction module to upload the optimal positioning result and/or other positioning results to a network server side or to the device according to a upload flow of the primary positioning submodule.

The monitoring module is configured to set different timers to control positioning periods of respective positioning submodules, wherein when a timer reaches a preset maximum positioning period and a corresponding positioning submodule doesn't output a positioning result, it is determined that the corresponding positioning submodule fails in positioning.

The aforementioned device can be widely applicable to various terminal equipments such as a mobile phone, a desk-top telephone and the like.

To sum up, by means the joint positioning, the present disclosure solves the problem that existing positioning applications have limited methods and poor accuracy, a user need not care about which positioning mode is used, a positioning application will take various positioning results into consideration, compare them, choose a result with the highest accuracy and feed it back to the user, thus improving greatly user experiences on the terminal; in addition, the application of the joint positioning to a terminal having a touch screen helps a lot in improving greatly the usability of a 3G mobile terminal and the reputation regarding user experiences.

Although the present disclosure is elaborated herein, the present disclosure is not limited to the above description, and those skilled in the art can make various modifications according to the principle of the present disclosure. Therefore, it will be appreciated that modifications made in accordance with the principle of the present disclosure should fall within the scope of protection of the present disclosure.

The invention claimed is:

1. A joint positioning device for a terminal comprising:
a memory storing executable instructions; and
a processor configured to be capable of executing the stored executable instructions to perform steps of:
after the terminal receives a positioning request, selecting a primary positioning sub device implementing a primary positioning mode and an auxiliary positioning sub device implementing an auxiliary positioning mode according to a communication scenario or a predetermined setting from multiple positioning sub devices;
wherein the primary positioning sub device and the auxiliary positioning sub device are configured to implement respectively a positioning operation and output respective positioning results of the terminal;
comparing the positioning results of the primary positioning sub device and the auxiliary positioning sub device, selecting an optimal positioning result from the positioning results and sending the optimal positioning result and/or positioning results other than the optimal positioning result to the primary positioning sub device instead of the auxiliary positioning sub device, such that the primary positioning sub device aggregates the optimal positioning result and/or positioning results other than the optimal positioning result; and reporting, as final positioning results of the terminal, the optimal positioning result and/or positioning results other than the optimal positioning result aggregated by the primary positioning sub device to a server or the terminal, wherein the processor is further configured to be capable of executing the stored programming instructions to perform the step of:

determining the primary positioning mode according to the communication scenario or the predetermined setting, selecting from the multiple positioning sub devices a positioning sub device implementing the primary positioning mode as the primary positioning sub device and selecting positioning sub devices implementing positioning modes other than the primary positioning mode as the auxiliary positioning sub device.

2. The joint positioning device according to claim 1, wherein the multiple positioning sub devices comprise a Wi-Fi positioning sub device, a base station positioning sub device and an Assisted Global Positioning System (AGPS) positioning sub device.

3. The joint positioning device according to claim 2, wherein when the communication scenario is in an open air, the Wi-Fi positioning sub device is selected as the primary positioning sub device.

4. The joint positioning device according to claim 2, wherein when the communication scenario is in an urban area or an indoor area, the AGPS positioning sub device is selected as the primary positioning sub device.

5. The joint positioning device according to claim 1, wherein the processor is further configured to be capable of executing the stored programming instructions to perform the step of:

setting different timers to control positioning periods of respective positioning sub devices, wherein when a timer reaches a preset maximum positioning period and a corresponding positioning sub device doesn't output a positioning result, it is determined that the corresponding positioning sub device fails in positioning.

6. The joint positioning device according to claim 1, wherein the primary positioning mode is determined according to a predetermined setting or a default setting of the terminal.

7. The joint positioning device according to claim 1, wherein the primary positioning mode is determined according to a predetermined setting or a default setting of the terminal.

8. A joint positioning method for a terminal comprising:
enabling a positioning device after the terminal receives a positioning request;
determining, by the positioning device, a primary positioning sub device implementing a primary positioning mode and an auxiliary positioning sub device implementing an auxiliary positioning mode according to a communication scenario or a predetermined setting;
wherein the positioning device comprises the primary positioning sub device and the auxiliary positioning sub device;
implementing respectively positioning by the primary positioning sub device and by the auxiliary positioning sub device, and outputting respective positioning results of the terminal to a comparison device of the terminal;
comparing, by the comparison device, the positioning results of the primary positioning sub device and the auxiliary positioning sub device, selecting an optimal positioning result from the positioning results and sending the optimal positioning result and/or positioning results other than the optimal positioning result to the primary positioning sub device instead of the auxiliary positioning sub device, such that the primary positioning sub device aggregates the optimal positioning result and/or positioning results other than the optimal positioning result; and
reporting, by the primary positioning sub device, the optimal positioning result and/or positioning results other than the optimal positioning result aggregated by the primary positioning sub device to a server or the terminal through an interaction device of the terminal,
wherein the step of determining by the positioning device a primary positioning sub device and an auxiliary positioning sub device according to a communication scenario or a predetermined setting comprises:
determining, by the positioning device, the primary positioning mode according to the communication scenario or the predetermined setting;
selecting, by the positioning device, from its multiple positioning sub devices a positioning sub device implementing the primary positioning mode as the primary positioning sub device and selecting positioning sub devices implementing positioning modes other than the primary positioning mode as the auxiliary positioning sub device.

9. The joint positioning method according to claim 8, wherein the positioning sub devices comprise a Wi-Fi positioning sub device, a base station positioning sub device and an AGPS positioning sub device.

10. The joint positioning method according to claim 9, wherein when the communication scenario is in an open air, the Wi-Fi positioning sub device is selected as the primary positioning sub device.

11. The joint positioning method according to claim 9, wherein when the communication scenario is in an urban area or an indoor area, the AGPS positioning sub device is selected as the primary positioning sub device.

12. The joint positioning method according to claim 8, wherein the step of determining, by the positioning device, the primary positioning mode according to the communication scenario or the predetermined setting comprises:

selecting, by the positioning device, a positioning mode having a longest positioning time as the primary positioning mode according to a communication scenario; or determining, by the positioning device, the primary positioning mode according to a predetermined setting or a default setting of the terminal.

13. The joint positioning method according to claim 12, after the step of sending the optimal positioning result and/or positioning results other than the optimal positioning result to the primary positioning sub device, the method further comprises:

processing, by the primary positioning sub device, the optimal positioning result and/or positioning results other than the optimal positioning result according to upload requirements of the primary positioning sub device.

14. The joint positioning method according to claim 12, further comprising:

setting, by a monitoring device of the terminal, different timers to control positioning periods of respective positioning sub devices;

when a timer reaches a preset maximum positioning period and a corresponding positioning sub device doesn't output a positioning result, determining that the corresponding positioning sub device fails in positioning.

15. The joint positioning method according to claim 8, after the step of sending the optimal positioning result and/or positioning results other than the optimal positioning result to the primary positioning sub device, the method further comprises:

processing, by the primary positioning sub device, the optimal positioning result and/or positioning results other than the optimal positioning result according to upload requirements of the primary positioning sub device.

16. The joint positioning method according to claim 8, further comprising:

setting, by a monitoring device of the terminal, different timers to control positioning periods of respective positioning sub devices;

when a timer reaches a preset maximum positioning period and a corresponding positioning sub device doesn't output a positioning result, determining that the corresponding positioning sub device fails in positioning.

17. The joint positioning method according to claim 8, wherein the primary positioning mode is determined according to a predetermined setting or a default setting of the terminal.

18. The joint positioning method according to claim 8, wherein the primary positioning mode is determined according to a predetermined setting or a default setting of the terminal.

* * * * *